United States Patent [19]
Johnson

[11] 3,862,680
[45] Jan. 28, 1975

[54] ARTICLE ALIGNMENT APPARATUS AND METHOD
[75] Inventor: John R. Johnson, Toledo, Ohio
[73] Assignee: Owens-Illinois, Inc., Toledo, Ohio
[22] Filed: Aug. 15, 1973
[21] Appl. No.: 388,632

[52] U.S. Cl. .............................. 198/30, 198/31 AB
[51] Int. Cl. ............................................ B65g 47/26
[58] Field of Search ......... 198/32, 161, 166, 31 AB, 198/30

[56] References Cited
UNITED STATES PATENTS
1,196,442   8/1916   Eick ...................................... 198/30
3,707,216   12/1972  Peres ................................... 198/32 X FOREIGN PATENTS OR APPLICATIONS
1,246,526   8/1967   Germany ............................. 198/30

Primary Examiner—Evon C. Blunk
Assistant Examiner—Douglas D. Watts
Attorney, Agent, or Firm—Steve M. McLary; E. J. Holler

[57] ABSTRACT

Apparatus and method for dividing a moving random mass of articles into at least one ordered single file of articles. At least one pair of article engagement members are slidably mounted in the path of travel of the mass of articles. The transverse separation of the article engagement members decreases from an inlet adjacent the mass of articles, the transverse separation there being large enough to allow more than one of the articles to enter between the article engagement members, to an outlet, where the transverse separation is such that only one article at a time may exit. Both article engagement members are continually moved, one in the direction of movement of the mass of articles and the other in the opposite direction. The respective direction of motion of the article engagement members is reversed in a cyclic pattern. If it is desired to separate the mass of articles into more than one single file, a plurality of pairs of moving article engagement members may be used to form a plurality of single files of articles.

5 Claims, 3 Drawing Figures

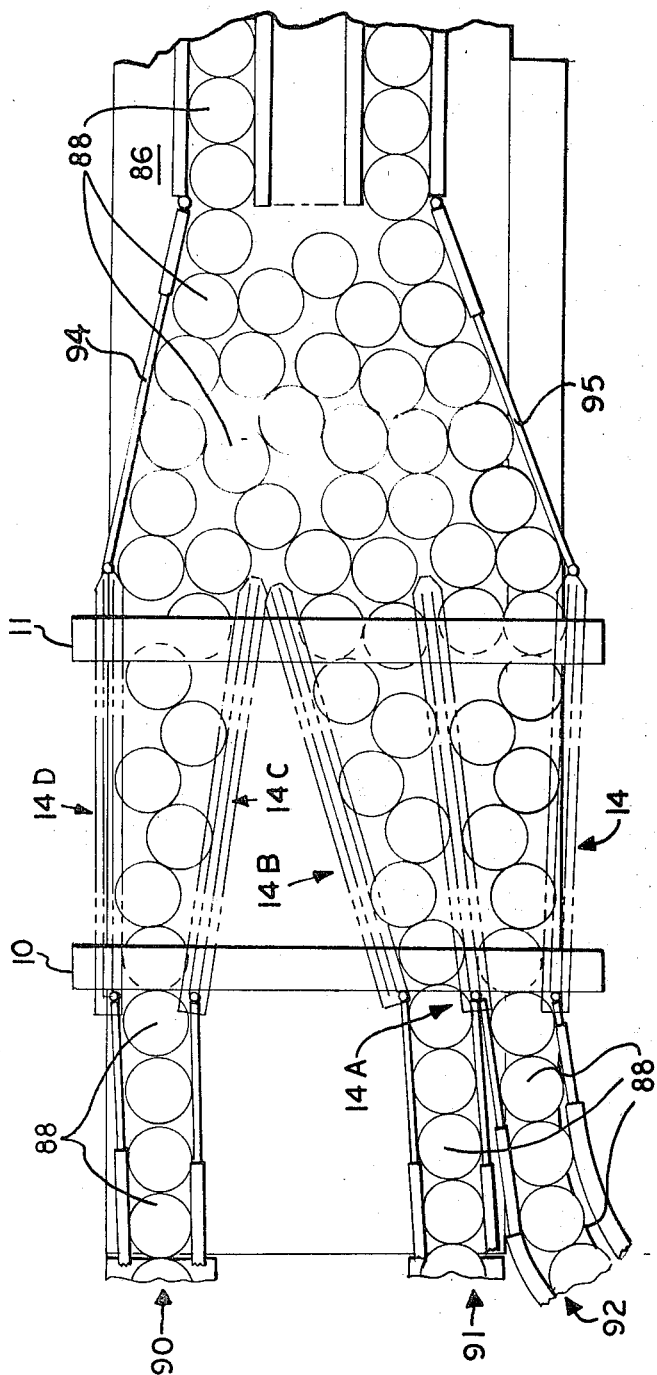

ARTICLE ALIGNMENT APPARATUS AND METHOD

BACKGROUND OF THE INVENTION

This invention generally relates to systems for aligning articles in a single file from an unordered mass of articles. Specifically, the invention relates to an article alignment system in which transversely separated article engagement members define a throat to align the articles in a single file and the article engagement members continuously move in opposite directions in a cyclic pattern.

The requirement of placing articles in a single file, or a plurality of single files, from an unordered, random mass of articles is one which appears in fields such as food and beverage processing and the manufacture of glass containers and cans. Many attempts to devise a fully successful system to accomplish this have been made. U.S. Pat. Nos. 3,707,216, 3,710,918 and 3,710,919 are three examples of prior art systems. A movable article engagement member is also sold by Northfield Freezing Systems, Inc., P.O. Box 98, Northfield, Minn. 55057 under the name of The Northfield Jogger. However, none of these devices have been completely successful in preventing a jam or bridge of articles from forming between the article engagement members and thus stopping the flow. I have found that by moving both article engagement members in opposite directions, in a repeating cycle, articles such as glass containers may be aligned without experiencing the jamming problems associated with similar devices of the prior art.

SUMMARY OF THE INVENTION

My invention is an improvement in an apparatus for separating a random mass of articles into at least one uniform single file of articles. In this apparatus, the articles are conveyed in mass by a conveying means to an article alignment area. In the article alignment area, a pair of longitudinally extending article engagement members are positioned. The article engagement members are positioned with a transverse separation which decreases from an inlet, adjacent the mass of articles, which allows more than one article at a time to enter between the article engagement members to an outlet where the transverse separation is such that only one article at a time may exit from between the article engagement members. My improvement is a means for moving, in a substantially linear path, one of the pairs of article engagement members in the direction of movement of the articles while moving the other one of the pair of article engagement members in a direction counter to the direction of movement of the articles.

BRIEF DESCRIPTION OF THE DRAWINGS

FIG. 3 is a top plan view of the operational environment of the apparatus of the present invention, with the present invention shown in schematic form.

FIG. 1 illustrates the apparatus of the present invention as generally removed from its operational environment. Two upper main support members 10 and 11 extend transversely across the width of a moving belt-type conveyor (see FIG. 3). Support struts 12 and 13 are attached to the main support members 10 and 11 and extend downwardly therefrom. An article guiding means 14 is attached to the support struts 12 and 13. A longitudinal beam 16 extends between and is attached to the support struts 12 and 13. Extending downwardly from and attached to the longitudinal beam 16 are three vertical column members 18, 19 and 20. The longitudinal beam 16 and the three vertical column members 18, 19 and 20 generally serve to make up a support frame. The vertical column members 18, 19 and 20 have holes drilled completely through them and inserted through the holes and pinned in position to maintain them in a rigid and fixed position are an upper rail 22 and a lower rail 23. It would be possible for this device to operate with only a single rail, preferably placed centrally, but to ensure smooth operation, the use of two rails 22 and 23 is preferred. In addition, the upper rail 22 and lower rail 23 are shown in this embodiment as being circular in cross section. This again is a matter of choice, and the rails could assume any configuration which would allow the sliding movement along the rails, to be described later.

An elongated article engagement member 24 is slidably mounted on the rails 22 and 23 through a first tie rod 26 and a second tie rod 27. The tie rods 26 and 27 have holes drilled through them to allow the rails 22 and 23 to pass through them. Preferably some sort of linear bearing is inserted in the holes in the tie rods 26 and 27 to allow smooth sliding movement of the tie rods 26 and 27 along the rails 22 and 23. At this point, it should be obvious that the article engagement member 24 may be slid along the rails 22 and 23 to any desirable position. The actual movement of the article engagement member 24 is accomplished through the action of a fluid motor 28 which has the blind end thereof attached to the vertical column member 19. The rod end of the fluid motor 28 is attached to the first tie rod 26. The fluid motor 28, as is the usual practice with such motors, has an operating rod 30 which may be extended and retracted as fluid is introduced to one end or the other of the fluid motor 28. It is this operating rod 30 which is connected to the first tie rod 26 through a suitable coupling member 31. It may be seen therefore that as the operating rod 30 is extended or retracted, the article engagement member 24 will be moved back and forth under the influence of the operating rod 30. It should further be realized that in FIG. 1 the operating rod 30 is shown in its generally fully extended position; that is, the article engagement member 24 is as far to the left as shown in FIG. 1 as it may move. As the operating rod 30 is retracted within the fluid motor 28, the article engagement member 24 would move to the right, as seen in FIG. 1. The article engagement member 24 itself has an upper spacer plate 32 and a lower spacer plate 34. The upper spacer plate 32 and lower spacer plate 34 are tied together as a unit by a plurality of wheel members 36 which extend between the spacer plates 32 and 34. The wheel members 36 are mounted with their axis of rotation extending between the upper spacer plate 32 and the lower spacer plate 34. In FIG. 1, all of the wheel members 36 are not shown in detail along the length of the article engagement member 24, but only representative ones of the wheel members 36 are shown. The center lines of the remainder of the wheel members 36 are shown. The plurality of wheel members 36 are repeated in a series which extends along substantially the entire longitudinal dimension of the article engagement member 24. Each of the wheel members 36 is secured in position as shown in the partial cross section in FIG. 1. The cross sectional area shown happens to be that which also illustrates the attachment of the first tie rod 26 to the article engagement member 24; however, it should be realized that the description for this particular area will apply to the remainder of the entire article engagement member 24. The first tie rod 26 is attached to a mounting base 38. Extending through holes in the mounting base are elongated bolts 40 and 41. The wheel members 36 are all of an annular design and thus have an opening extending completely through their longitudinal dimension. The elongated bolts 40 and 41 extend through the holes in the mounting base 38 completely through the wheel members 36 which engage at this particular position and are screwed in position in tapped holes formed in the lower spacer plate 34. All of the wheel members 36 are mounted in a similar manner with bolts extending through them and engaging in tapped holes in the lower spacer plate 34. The particular configuration chosen for the wheel members 36 may be varied according to the operational conditions involved. However, the embodiment shown in FIG. 1 is one which has proven to be particularly workable. In this embodiment, the actual wheels themselves are formed by removing material from a section of low-friction tubing, such as polyethylene, to form a shaft with a series of wheels extending beyond the diameter of the shaft. In addition, it may be seen that the wheel members themselves are offset in an alternating pattern such that one wheel overlaps slightly into the shaft section of an adjacent wheel member 36.

The specific embodiment shown in FIG. 1 is an article guiding means 14 which may be considered to be a master unit for use with a plurality of such article guiding means 14. The distinctive features which make this particular unit a master unit are a four-way pilot-operated valve 42, two normally closed sequencing valves 44 and 45, and a position control cam 46 which is attached to and moves with the article engagement member 24. As may be clearly seen, the normally closed sequencing valves 44 and 45 are positioned such that the control cam 46 will strike these two valves at the extreme limits of its travel. Both of the sequencing valves 44 and 45 are of the type which remain closed unitl an operating button is depressed. So long as this button remains depressed, fluid may flow through these valves from an outlet port. The sequencing valves 44 and 45 preferably should be offset somewhat from the center of the rails 22 and 23. This then allows the position control cam 46 to move back and forth freely without interfering with the rails 22 and 23. It may be noted in FIG. 1 that a phantom position of the position control cam 46 is shown which illustrates its position in the furthest right mode as viewed in FIG. 1. The sequencing valves 44 and 45 could be mounted to allow adjustment of the total travel of the article engagement member 24. The valves 44 and 45 could be mounted on bolts inserted in elongated slots. Movement of the valves 44 and 45 toward one another would shorten the stroke of the article engagement member 24. In FIG. 1, the valves 44 and 45 are set to allow maximum travel of the article engagement member 24.

As previously noted, the article engagement member 24 is in its furthest left position as shown in FIG. 1, and consequently the position control cam 46 has engaged the operating button of the sequencing valve 45 to shift the flow of fluid to the fluid motor 28. A source of fluid under pressure, and for convenience the operating fluid henceforth will be described in terms of high pressure air, is connected to the four-way valve 42 through an inlet pipe 48. A manifold 49 on the four-way valve 42 feeds air, not only into the four-way valve 42, but also into the sequencing valve 44 through a pipeline 50. The pipeline 50 is connected to the inlet port of the sequencing valve 44 through a manifold 51. The manifold 51 thus introduces air, not only to the sequencing valve 44, but also into the inlet port of the sequencing valve 45 through a pipeline 52. It shoud be evident that the pipelines 52 and 50 could both be connected to their respective valves from the manifold 49 on the four-way valve 42 if desired. The four-way valve 42 is preferably of the spool type, wherein a pilot air signal may be introduced into either end of the valve 42 and thus shift the spool within the valve 42, thereby changing the direction of output of the main air supply furnished to the valve 42 through a pipeline 48. The sequencing valve 44 has its outlet port connected to one pilot inlet port of the valve 42 through a pipeline 54. The sequencing valve 45 has its outlet port connected to the other pilot inlet port of the valve 42 through a pipeline 56. Thus, in the configuration shown in FIG. 1, the spool within the valve 42 had been shifted previously by introduction of air through the pipeline 54. As shown in FIG. 1, the position control cam 46 has just depressed the operating button of the sequencing valve 45, thus allowing air to be introduced though the pilot pipeline 56 to the valve 42. This will shift the position of the spool within the valve 42. The position the spool within the valve 42 had just held was such that the air was introduced to the blind end of the fluid motor 28 to allow the operating rod 30 to be extended to its fully left position, as seen in FIG. 1. With the pilot air coming through the pipeline 56, the spool within the valve 42 will be shifted to introduce air to the rod end of the fluid motor 28 to cause the operating rod 30 to be retracted to its fully right position. The four-way valve 42 has at least two outlet lines designated as 58 and 59. The air introduced through the inlet pipeline 48 will exit through one or the other of these two outlet lines 58 or 59, depending upon the position of the spool within the valve 42, the position of the spool being dependent upon which end of the valve 42 had previously received a pilot air signal from the pipelines 54 and 56. The outlet pipe 58 is connected to a manifold 60. The outlet pipe 59 is connected to a manifold 62. The purpose of the manifolds 60 and 62 is to allow the outlet air signals or pressure from the four-way valve 42 to be fed to a number of article guiding means 14. Thus, it is necessary to have only one four-way valve 52 with its associated sequencing valves 44 and 45 and positional control cam 46. From the manifold 60, a pipeline 64 is connected to the blind end of the fluid motor 28. A speed control valve 66 may be positioned at the blind end inlet of the fluid motor 28 in line with the pipeline 64. The speed control valve 66 allows adjustment of the speed with which the article engagement member 24 will be moved. A pipeline 68 connects the manifold 62 to the rod end inlet of the fluid motor 28. Another speed control valve 70 may likewise be connected to the rod end inlet of the fluid motor 28 in series with the pipeline 68 for control of the speed of movement of the article engagement member 24. It is, of course, realized that the for-way valve 42 has a vent port which is not shown through which the air within the fluid motor 28 is expelled during movement of the operating rod 30 from a fully extended to fully retracted position or vice versa. In this case, the lines 64 or 68 will act as an exhaust line rather than a pressurized air inlet line. This is conventional practice, and it is not believed necessary to show this precise path of flow for full understanding of the operation of this device.

FIG. 2 shows the entire control circuit for operating a plurality of article guiding means 14 as units to obtain the best possible article separation. In FIG. 2, five substantially identical fluid motors 28, 28A, 28B, 28C and 28D are shown. The manifold 60 is connected to the blind end of the fluid motors 28, through a pipeline 64, 28B, through a pipeline 72, and 28D, through a pipeline 73. The manifold 60 is connected to the rod ends of the fluid motors 28A, through a pipeline 75, and 28C, through a pipeline 76. The manifold 62 is connected to the rod end of the fluid motors 28, through 68, 28B, through a pipeline 78, and 28D, through a pipeline 79. The manifold 62 is connected to the blind ends of the fluid motors 28A, through a pipeline 81, and 28C, through a pipeline 82. Note that a source of fluid under pressure 84 is shown as being connected to the valve 42 through the inlet pipeline 48. As will be made more evident with respect to FIG. 3, this particular connection configuration allows one fluid motor to be moving in a direction opposite the fluid motor immediately adjacent to it. That is, if the fluid motors 28, 28B and 28D would be moving to the left, as viewed in FIG. 2, the fluid motors 28A and 28C would have their operating rods moving to the right as viewed in FIG. 2. Since it is the operating rod of the fluid motors which moves the article engagement member 24, it is therefore obvious that adjacent article engagement members 24 are likewise moving in opposite directions from one another.

FIG. 3 illustrates the generaly operational configuration of the article guiding means 14. In FIG. 3, five individual article guiding means 14, 14A, 14B, 14C and 14D are suspended above an endless moving conveyor 86 from the upper main support members 10 and 11. The upper main support members 10 and 11 are themselves supported by vertical columns, which are not visible in FIG. 3, which attach to the side frame of the endless moving conveyor 86. Articles which are to be segregated or separated are fed on the endless moving conveyor 86. In this case, the articles may be considered to be glass containers 88. The glass containers 88, in this situation, are fed in two distinct lines into an area on the conveyor 86 which allows them to be formed into a mass in a random fashion with all of the glass containers 88 standing on their bottoms or in an upright positon. The article guiding means 14 through 14D are arranged in the path of travel of the mass of glass containers 18. They are suspended above the conveyor 86 from the upper main support members 10 and 11 at a position which is just above the moving conveyor 86. It should be appreciated that the requirement of five article guiding means 14 through 14D is determined in the particular embodiment illustrated in FIG. 3 due to the position of three independent outlet conveyor lines 90, 91 and 92. If the three outlet conveyor lines 90, 91 and 92 were side by side or in such a position that they were at least closely adjacent to one another, a minimum of four article guiding means 14 could be used; that is, the adjacent sidewalls of the article guiding means 14 could be used for another discrete article separation path. In this particular situation, though, the separation of the outlet conveyor lines 90, 91 and 92 is such that five article guiding means 14 through 14D are required. A typical pair of article guiding means is 14C and 14D. It may be appreciated in this case that there is an inlet or throat area to these two article guiding means which is adjacent to the mass of articles 88. At this inlet, the article guiding means 14C and 14D are spaced apart such that no more than two articles 88 may enter at one time. As the articles travel from the inlet toward an outlet, which feeds into the outlet conveyor line 90, the transverse separation between the two article guiding means 14C and 14D narrows until only a single article 88 may leave from the outlet at any one time. This, then, is the case likewise with the article guiding means pair 14B and 14A and 14 and 14A. Note that the article guiding means 14A serves as one restraining wall for both the article guiding means 14 and 14B. In all cases shown here, the operation of the article guiding means is the same as described for the article guiding means 14C and 14D. Glass containers 88 enter at the inlet end and are placed into a single file as they leave the outlet end. The ability of the article guiding means 14 through 14D to move back and forth helps prevent the glass containers 88 from jamming or bridging and stopping the flow through this article separation or segregating machanism. In addition, the movement of one article guiding means in one direction while the other article guiding means is moving in the opposite direction further enhances the movement of the glass containers 18 and aids in preventing bridging and jamming of the glass containers 88 during their travel between the pairs of article guiding means.

Figure 1:
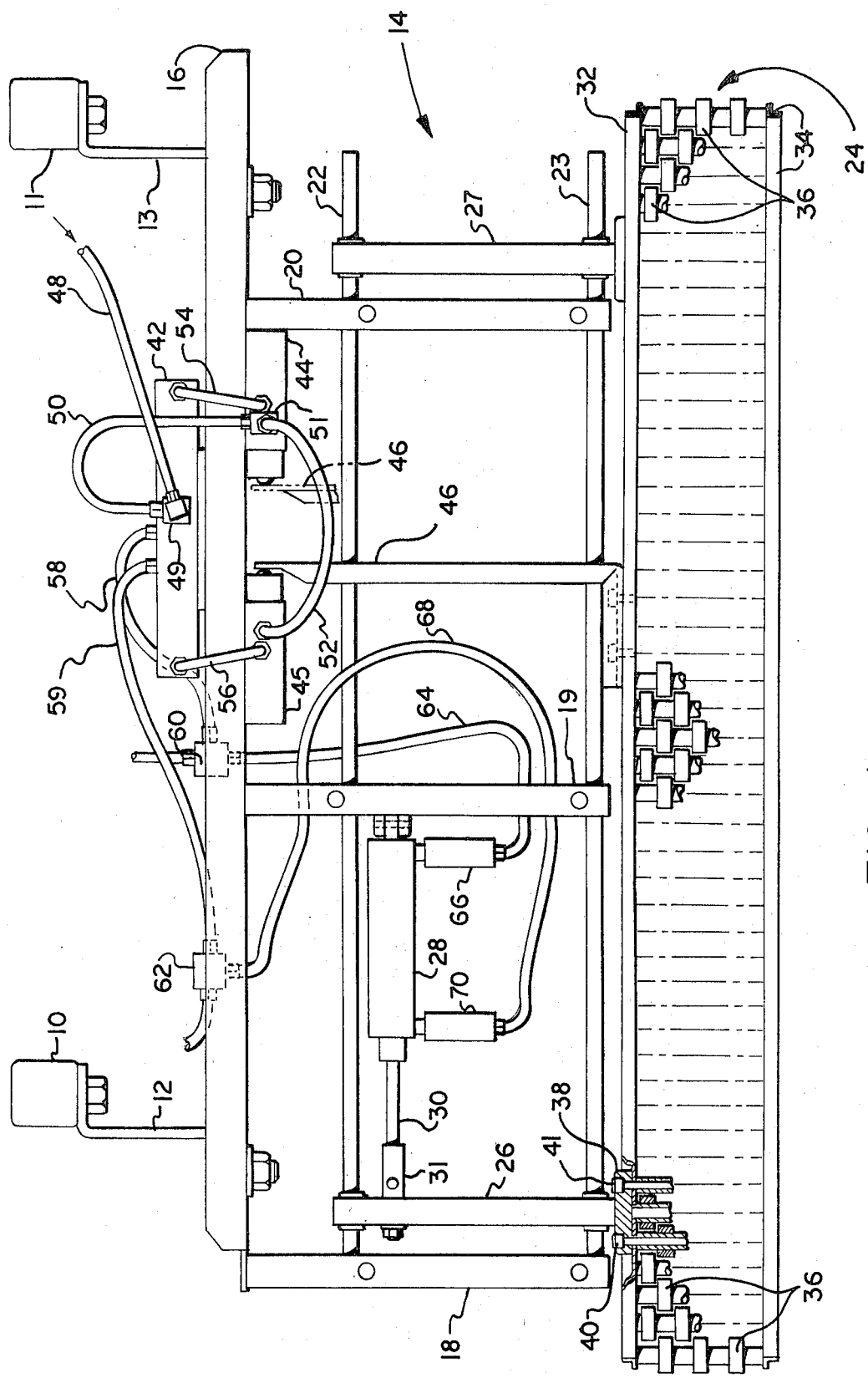
FIG. 1 is a side elevation view of the apparatus of the present invention.
Figure 2:
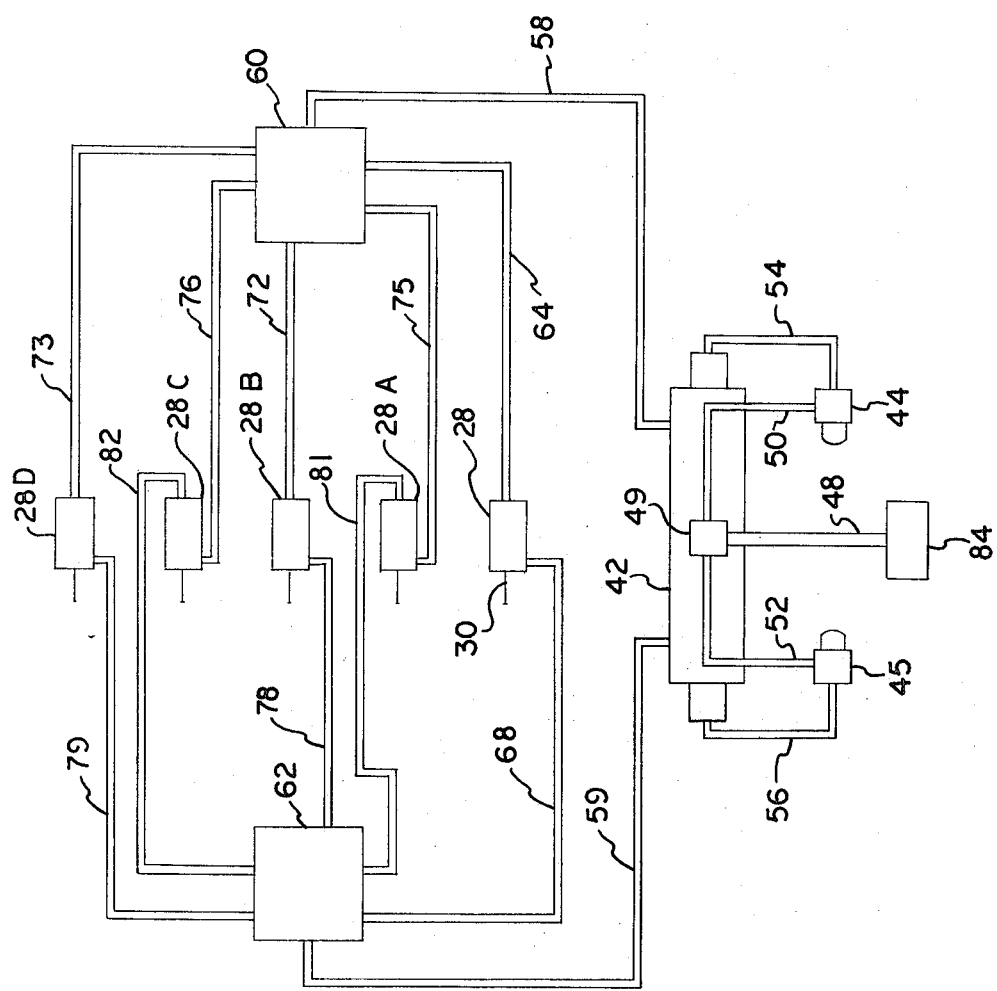
FIG. 2 is a schematic circuit diagram of the control system of the present invention.

The area in which the mass of glass containers 88 is held prior to entering the article guiding means 14 through 14D is in part defined by flexible guide rail members 94 and 95. The flexible guide rail members 94 and 95 are made of a coil spring inserted in a length of thermoplastic tubing. The guide rail members 94 and 95 are attached to the ends of the article guiding means 14D and 14 respectively. The coil spring construction allows the guide rail members 94 and 95 to elongate the contract as their respective article engagement member 24, to which they are attached, is moved. The stroke of the article engagement members 24 is typically about 2 inches. The movement of the guide rail members 94 and 95 prevents a gap from forming as a result of this motion. A fixed guide rail would allow such a gap which encourages jams. The outlet conveyor lines 90, 91 and 92 may use similar flexible guide rail members, but the problem is not so critical at this point, and fixed guide rails may be used. The gap which does occur in this case does not lead to jams, since the glass containers 88 are in single file at this point. In addition, during the movement of the article guiding means 14 through 14D as the glass containers 88 are forced into a single file, some of the mass of glass containers 88 may have a tendency to move backward in the direction from which they had previously come. This movement is compensated for by the flexible guide rail members 94 and 95 bowing outwardly in response to this movement. This movement prevents jamming of glass containers during this movement and enhances the operation of the overall separating system.

It should be apparent from the foregoing description that the apparatus thus described in its most general usage would be available to separate a mass of glass containers 88 into one single file. However, the specific embodiment illustrated in FIG. 3 was used to demonstrate the flexibility of the entire system and thus the requirement of separating the mass of glass containers 88 into three separate lines is simply by way of an illustration. Again, it should be kept in mind that in the embodiment shown in FIG. 3, only one of the article guiding means 14 through 14D will be a master unit such as that illustrated in FIG. 1 with the control valve 42 and other associated valves connected to it. The other article guiding means 14A through 14D are so-called slave units which do not have the control unit present, but have only the fluid motor 28 which responds to air signals as generated by the control valve 42.

I claim:

1. Apparatus for separating a mass of articles conveyed in random fashion by a conveying means into at least one ordered, single file of articles comprising, in combination:

a first linearly movable article guide means positoned in the path of travel of said mass of articles for guiding said articles;

a second linearly movable article guide means for guiding said articles positioned adjacent to said first article guide means, the transverse separation of said first and second article guide means decreasing from an inlet adjacent said mass of articles to an outlet remote from said mass of articles, the separation at said outlet being such that only one article at a time may pass therethrough, said first and second movable article guide means each comprising:

a fixed support frame suspended above said conveying means;

at least one longitudinally extending rail attached to said support frame;

an elongated article engagement member slidably mounted on said rail for linear, reciprocal movement along said rail;

an upper spacer plate;

a lower spacer plate; and a plurality of rotatably mounted wheel members extending between said upper and lower spacer plates with their axis of rotation extending between said upper and lower spacer plates, said plurality of wheel members being repeated in a series of said wheel members extending substantially the entire longitudinal dimension of said article egagement member;

drive means for reciprocating said first and second article guide means; and control means, connected to said drive means, for setting the direction of movement of said first article guide means in the direction of travel of said articles when said second article guide means is moving counter to the direction of travel of said articles and for setting the direction of movement of said first article guide means counter to the direction of travel of said articles when said second article guide means is moving in the direction of travel of said articles.

2. The apparatus of claim 1, wherein said drive means comprises a first and a second fluid motor, each attached to said fixed support frame, said fluid motors having a linearly reciprocal operating rod attached to said article engagement member.

3. The apparatus of claim 2, wherein said control means comprises:

a valve having at least one inlet port and at least a first outlet port and a second outlet port;

a source of fluid under pressure connected to said inlet port of said valve, said valve being set to pass said fluid through either said first or said second outlet port;

means for connecting said first outlet port to the operating rod end of said first fluid motor and to the end opposite said operating rod of said second fluid motor;

means for connecting said second outlet port to the end of said first fluid motor opposite said operating rod and to the operating rod end of said second fluid motor; and means for switching said valve in a cyclic pattern to alternatively provide a fluid flow from said first outlet port and said second outlet port.

4. The apparatus of claim 3, wherein said valve is a pilot fluid operated spool type having a first pilot fluid inlet port and a second pilot fluid inlet port, and wherein said means for switching said four-way valve comprises:

a first normally closed valve, located adjacent said support frame, having a mechanically actuated operating button, having an inlet port connected to said source of fluid under pressure and an outlet port connected to said first pilot fluid inlet port;

a second normally closed valve, longitudinally spaced apart from said first normally closed valve and located adjacent said support frame, having a mechanically actuated operating button, and having an inlet port connected to said source of fluid under pressure and an outlet port connected to said second pilot fluid inlet port; and cam means, carried by said article engagement member, positioned to open said first normally closed valve at one extreme position of its travel and open said second normally closed valve at the other extreme position of its travel.

5. In an apparatus for separating a random mass of articles into at least one uniform single file of articles of the type wherein said articles are conveyed in mass by a conveying means to an article alignment area, wherein a pair of longitudinally extending article engagement members are positioned with a decreasing transverse separation from an inlet adjacent said mass of articles which allows more than one article at a time to enter between said article engaging members to an outlet where said transverse separation is such that only one article at a time may exit therefrom, the improvement in said apparatus which comprises:

means for moving, in substantially linear path, one of said pair of article engagement members in the direction of movement of said articles while moving the other of said pair of article engagement members in a direction counter to the direction of movement of said articles, said means for moving said pair of article engagement members comprising:

an individual frame supported adjacent said conveying means for each of said pair of article engagement members;

a longitudinally extending rail attached to each of said frames, said article engagement members being slidably mounted on said rails;

a first fluid motor attached to one of said frames and having a linearly reciprocable operating rod attached to said article engagement member mounted on said one of said frames; and a second fluid motor attached to the other one of said frames and having a linearly reciprocable operating rod attached to said article engagement member mounted on said other one of said frames; and means for reversing the respective direction of movement of said pair of article engagement members, after completion of a pre-selected distance of travel, in a repeating cycle, said means for reversing the respective direction of movement of said pair of article engagement members comprising:

valve means having at least one inlet port and at least a first and a second outlet port;

a source of fluid under pressure connected to said inlet port, said valve means having a selectable normally open path from said inlet port to either said first outlet port or said second outlet port;

means for connecting said first outlet port to the operating rod end of said first fluid motor and to the end of said second fluid motor opposite the operating rod thereof;

means for connecting said second outlet port to the end of said first fluid motor opposite the operating rod thereof and to the operating rod end of said second fluid motor; and means for switching said valve means in a cyclic pattern to alternatively provide a fluid flow from said first outlet port and said second outlet port.

* * * * *